UNITED STATES PATENT OFFICE.

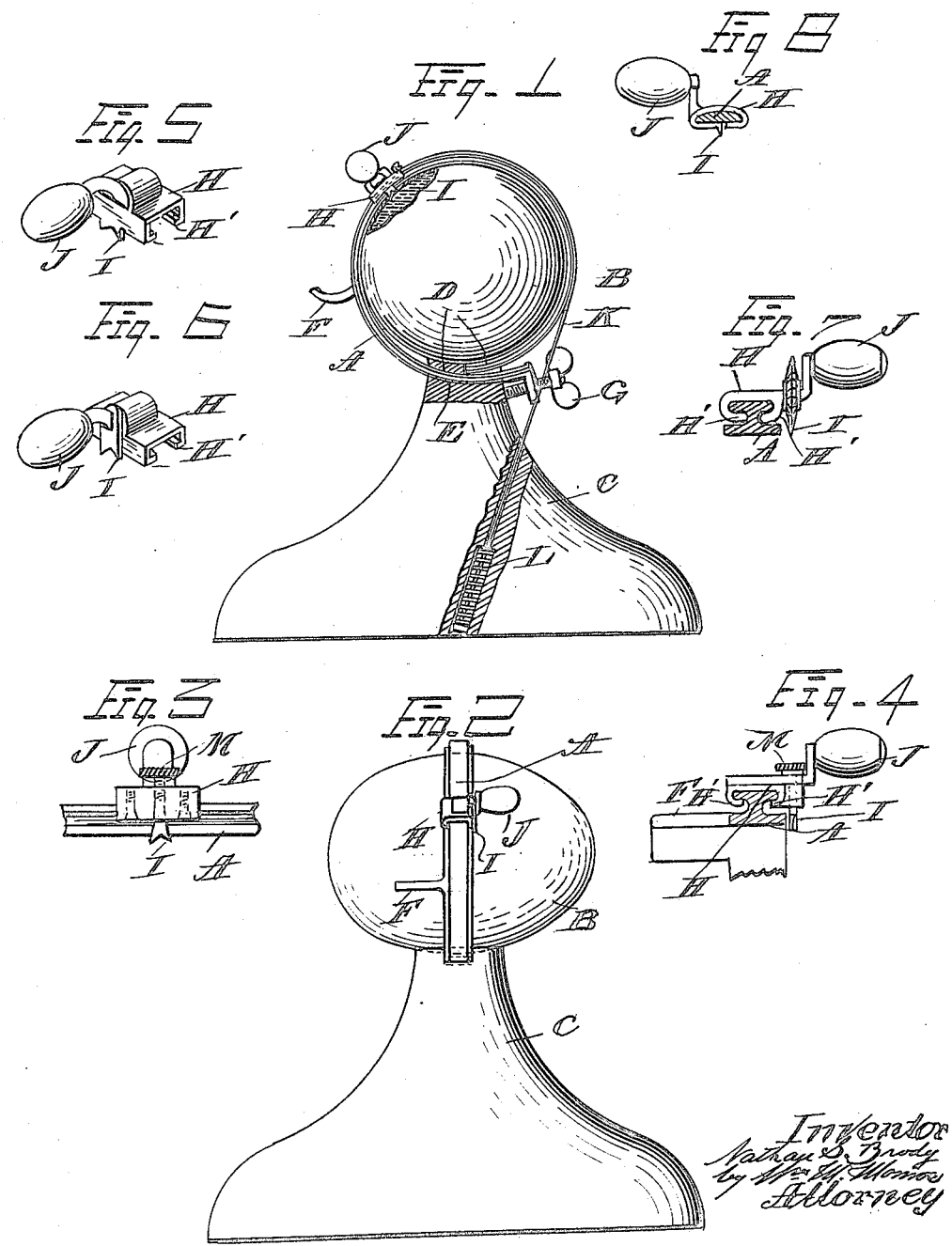

NATHAN S. BRODY, OF CLEVELAND, OHIO.

RAW-EGG-SHELL-CUTTING DEVICE.

1,403,383.                Specification of Letters Patent.    Patented Jan. 10, 1922.

Application filed May 31, 1921. Serial No. 473,853.

*To all whom it may concern:*

Be it known that I, NATHAN S. BRODY, a citizen of the United States, and resident of Cleveland, in the county of Cuyahoga and State of Ohio, have invented certain new and useful Improvements in Raw-Egg-Shell-Cutting Devices, of which I hereby declare the following to be a full, clear, and exact description, such as will enable others skilled in the art to which it appertains to make and use the same.

The objects of the invention are to provide a simple and efficient device for cutting the shell of a raw egg and by means of which the shell can be severed, throughout almost its entire circumference, leaving a portion of the shell unsevered, thus permitting it to be handled after cutting, but enabling the operator to easily separate the parts in unbroken condition.

The invention comprises, the combination and arrangement of parts, hereinafter described, showing in the accompanying drawings, and specifically pointed out in the claims.

In the accompanying drawings Fig. 1, is an end elevation of the device, a portion of the egg being broken away to show the operation of the knife cutter; Fig. 2, is a side elevation thereof; Fig. 3, is a front elevation of the movable cutter holder, and detachable knife cutter; Fig. 4, is a transverse section of the egg holding band showing the movable cutter holder in side elevation, and showing a detachable knife cutter; Fig. 5, is a perspective of a cutter holder containing an integral cutter; Fig. 6, is a perspective of a cutter holder showing a cutter secured to the shank of the handle; Fig. 7, shows a cutting wheel secured in the same manner as shown in Fig. 6; Fig. 8, shows a cutter integrally and centrally secured to a modified form of egg holding band.

In these views A, is a band of flexible hard material such as metal, which retains the egg B, in position upon a support of pedestal C, this band is adjustable to the size of the egg.

One end of this band is secured at D, to the pedestal, and the other end is passed through an opening E, in the pedestal. A projection F, to be moved by the finger, permits clamping the band upon the egg, and a final adjustment is preferably provided by means of the screw G, passing through the turned over extremity of the band.

When the egg has been secured upon the pedestal, a cutter holder H, slidably movable upon the band and provided with a cutting tooth or teeth I, and with a projecting handle J, is secured circumferentially around the shell of the egg, through a large portion of its circumference, from one side of the pedestal B, to the other, leaving a small portion of the shell uncut, so that the egg can be handled, but not preventing the parts from being easily separated.

In Fig. 1, a flexible wire K, may be attached to the cutter holder H, and is passed over the surface of the band A, the other extremity being engaged by the spring L, so that when the knife holder is released it will spring back to its original position.

The cutter holder H, is slidably secured in any suitable manner to the band A.

In Figs. 1, 2, 3, 4, 5, 6 and 7, the band is I-shaped in cross section and the cutter holder is provided with turned in edges H', H', which traverse the channels in the band, and the cutter I, is detachably secured to the holder H, by means of the nut M, as shown in Figs. 3 and 4, or is sleeved over the shank of the handle as shown in Fig. 6, or is integral as shown in Figs. 5 and 8, or is attached in any desirable manner.

In Fig. 8, the cutter is centrally mounted inside the band, and in other figures, it moves at one side of the band.

In Fig. 7, the cutter is disc shaped and may be toothed if desired.

Having described the invention what I claim as new and desire to secure by Letters Patent is:

1. In an egg shell cutter, a pedestal, adapted to support an egg, a flexible member secured thereto at one end and having the other end movable therein, said flexible member adapted to encircle said egg, a straining means for said flexible member, and a runner upon said flexible member and a cutter in said runner.

2. In an egg shell cutter, a support for the egg, a flexible member secured to said support, and adapted to encircle said egg, a straining means for said flexible member, a runner movable longitudinally of said flexible member, a cutter secured to said runner, and resilient means for returning the runner to the place of starting.

3. In an egg shell cutter, a support for the egg, a flexible clamping means adapted to encircle the egg, one extremity of said clamping means secured in said support and the other movable in said support, a handle for operating said flexible clamping means, and a runner movably mounted on said flexible support, a handle for said runner, and a cutter attached to said runner.

4. In an egg shell cutter, a support for the egg, a flexible band having laterally extending ribs and adapted to encircle said egg, a straining means for said band, a runner having engaging means for said ribs, and longitudinally movable on said band, and a cutter detachably secured to said runner.

In testimony whereof, I hereunto set my hand this 19th day of May, 1921.

NATHAN S. BRODY.

In presence of—
  WM. M. MONROE,
  S. A. WILLIAMSON.